March 19, 1946. W. REED 2,396,881
SELF PROPELLED VEHICLE
Filed July 6, 1944 4 Sheets-Sheet 4
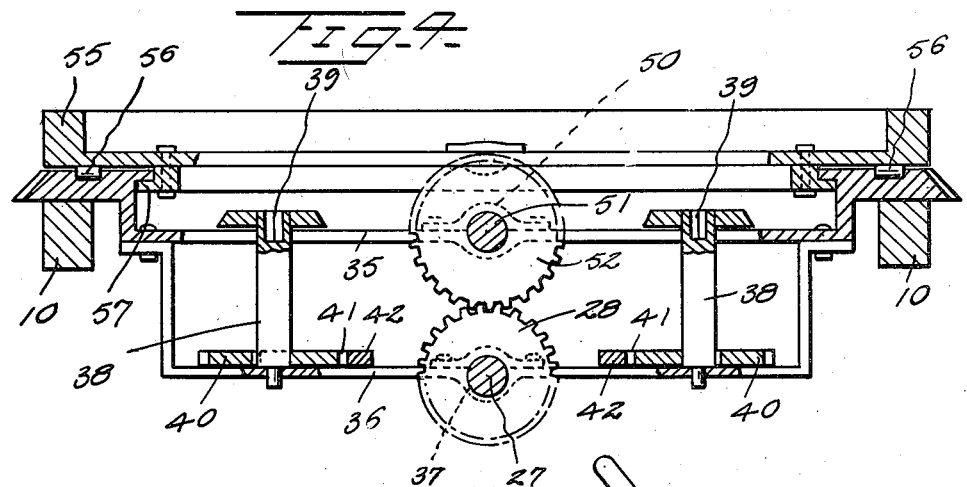
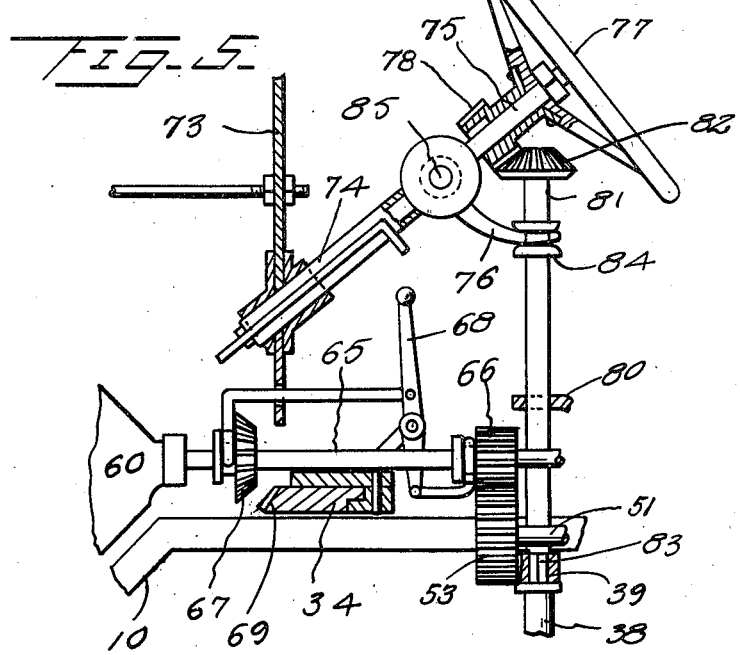
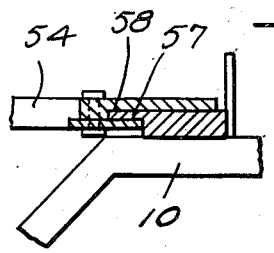
Inventor
W. Reed
Attorney Patented Mar. 19, 1946

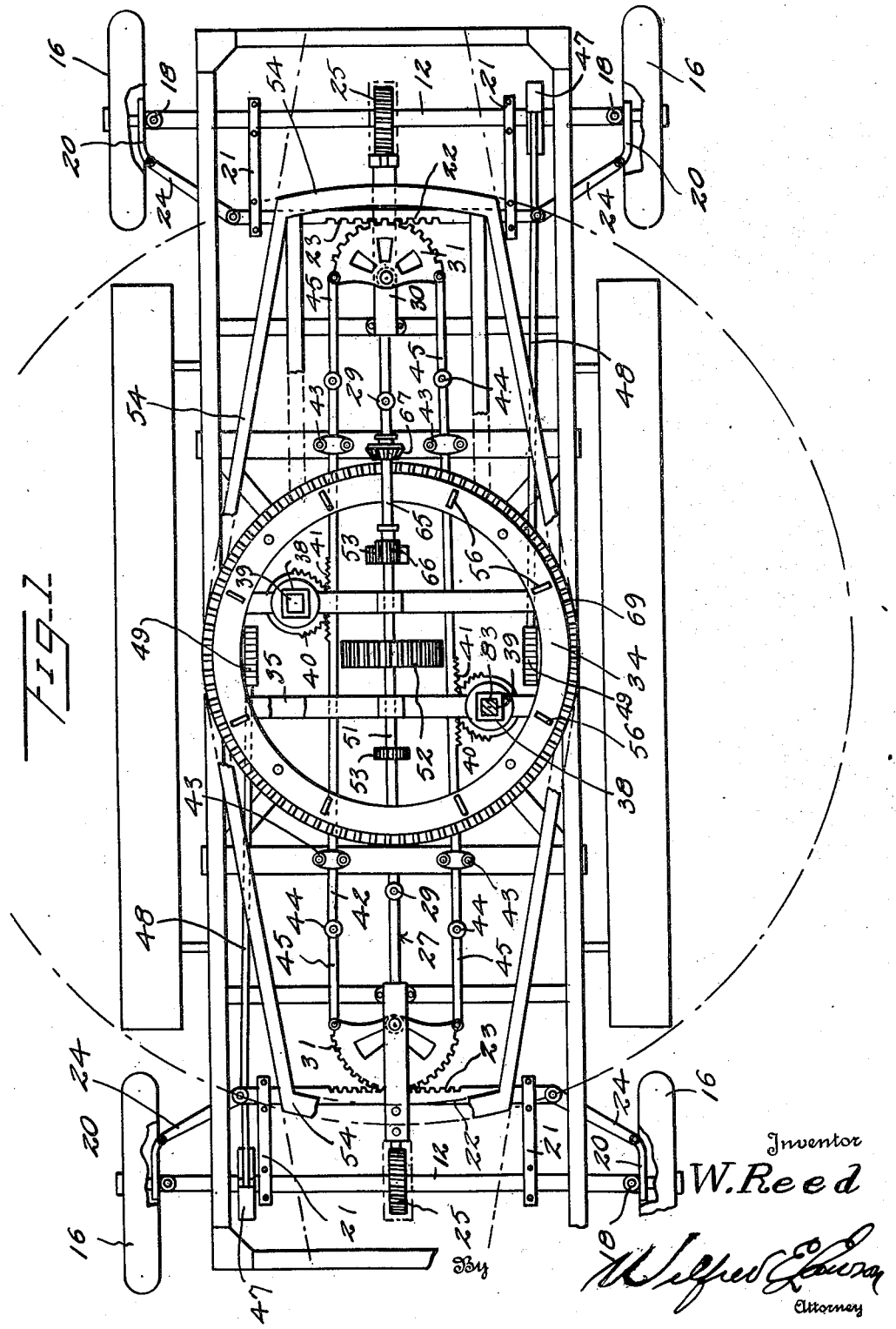

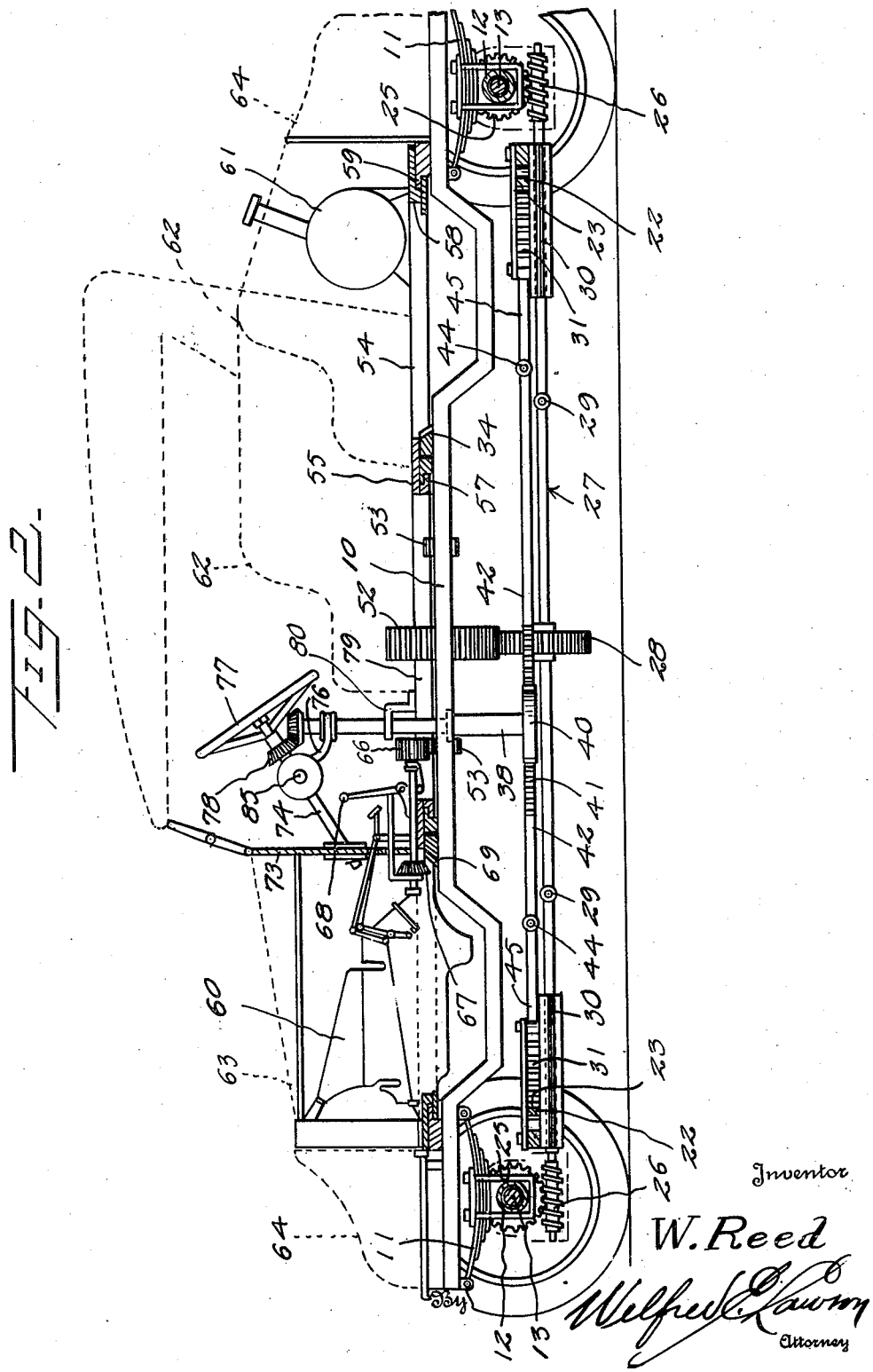

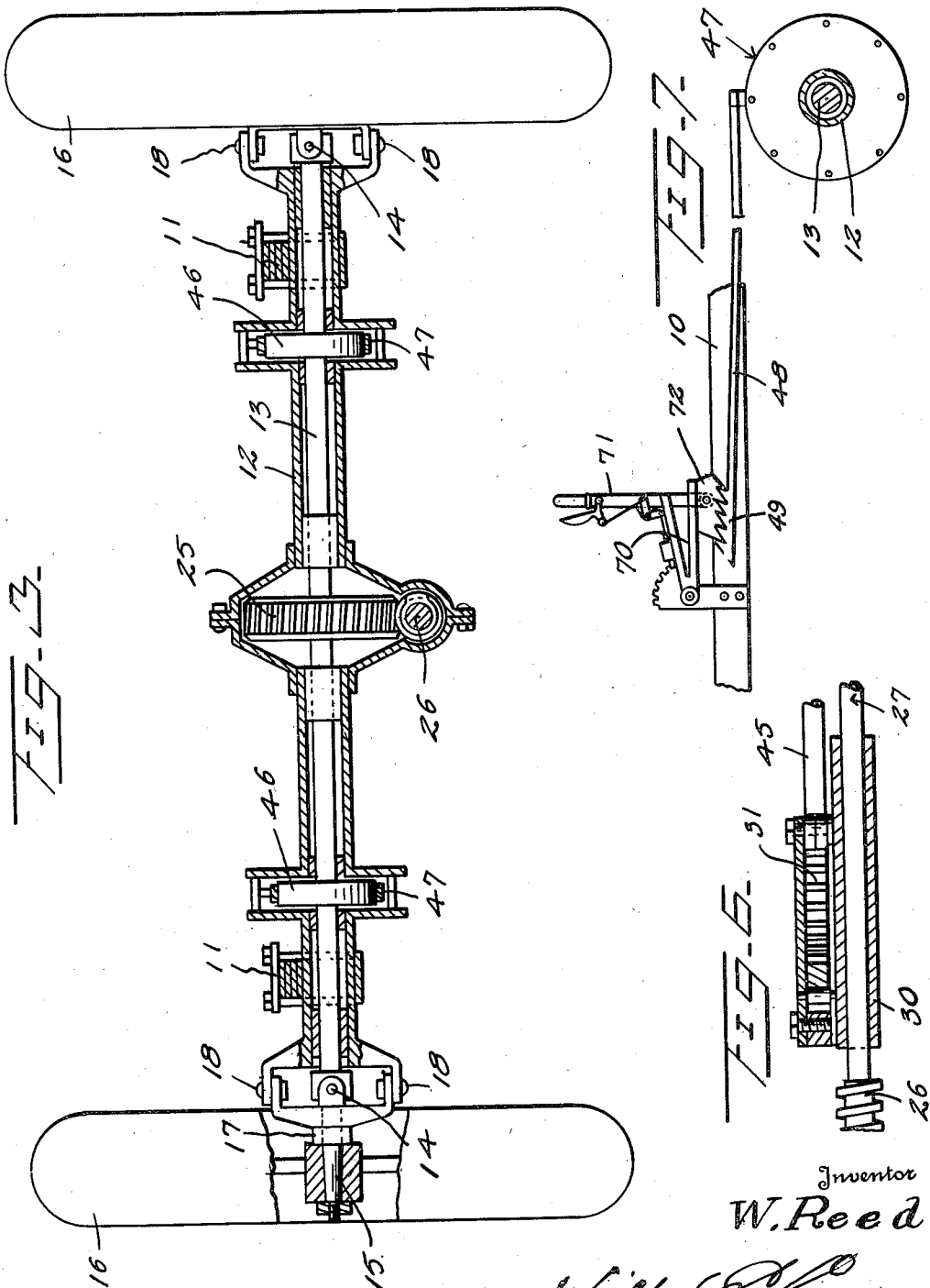

2,396,881

UNITED STATES PATENT OFFICE 2,396,881

SELF-PROPELLED VEHICLE

Willie Reed, Memphis, Tenn., assignor of one-half to Chester C. Jackson, Memphis, Tenn.

Application July 6, 1944, Serial No. 543,664

6 Claims. (Cl. 180—1)

This invention relates to self-propelled vehicles, and more particularly to a vehicle having a reversible body.

An important object of the invention is to provide a vehicle, the body of which may be reversed upon the chassis to permit reversing of the seating arrangement without reversing the chassis.

A further object of the invention is the provision of a device of this character which will enable the reversal of the body to be accomplished by the engine furnishing the power to drive the vehicle.

A still further object of the invention is to provide a chassis construction and drive transmission, permitting of such reversal and providing efficient and dependable driving connections between the engine supported from the reversible body and the chassis.

A still further object of the invention is to provide a chassis construction of such character that the operation of the vehicle will be identical in its characteristics without regard to the direction of operation.

These and other objects I attain by the construction shown in the accompanying drawings, wherein for the purpose of illustration is shown a preferred embodiment of my invention and wherein:

Figure 1 is a plan view of the chassis of the vehicle constructed in accordance with my invention, parts being broken away:

Figure 2 is a longitudinal sectional view therethrough, the body outline being illustrated in dotted lines:

Figure 3 is a longitudinal sectional view through one of the drive axles and the wheels supported thereby:

Fig. 4 is a transverse sectional view through the body frame support upon which the body rotates:

Figure 5 is a detail sectional view through the steering mechanism:

Figure 6 is a detail sectional view through the mounting of the operating mechanism for the steering wheels:

Figure 7 is a detail view showing the connections and manner of operating the brake:

Figure 8 is a detail sectional view showing the manner in which the ends of the body engage with the ends of the chassis frame.

Referring now more particularly to the drawings, the numeral 10 generally designates the chassis frame of the vehicle supported at its opposite ends by springs 11 from tubular axles 12. Each axle 12 has rotatably mounted therein a drive axle 13. This drive axle in each instance is equipped at its outer ends with universal drive connections 14 driving the spindles 15 of steering driving wheels 16. A bearing 17 for the spindle is pivoted to vertically aligned pivots 18 carried by the tubular axle, so that the wheel may partake of steering movements. This bearing has associated therewith a steering arm 20. Extending inwardly from the axles adjacent the ends thereof are supports 21 within which are mounted for transverse reciprocation steering bars 22, the central portions of the rear faces of which are formed as racks 23. The ends of the steering bar 22 are connected with the arms 20 associated therewith by links 24.

Secured to each drive axle is a worm gear 25 with which is engaged one of a pair of worms 26 secured to the opposite ends of a drive shaft 27. This drive shaft at its center has secured thereto a gear 28 and at opposite sides of its center is provided with universal joints 29. This drive shaft adjacent the ends thereof is extended through bearing tubes 30, which form supports for segments 31 meshing with the rack 23.

At the center of the chassis frame an annular support 34 is mounted thereon. This support has attached thereto transversely extending braces 35 and 36, of which the braces 35 are arranged immediately above the braces 36. The braces 36 provide bearings 37 for the drive shaft 27 and rotatably receive the lower ends of short shafts 38, the upper ends of which are mounted in the associated braces 35. These shafts are disposed at corresponding points lying at opposite sides of the axis of the annular support 34 and each has its upper end socketed, as at 39, for a purpose presently to appear.

Secured to these shafts above the supports 36 are segment gears 40 meshing with racks 41 formed upon the faces of longitudinally extending rods 42 mounted in supporting guides 43 carried by the frame 10. The outer ends of these rods are universally connected at 44 with links 45, the outer ends of which are connected to the segments 31.

It will be seen that upon rotation of either short shaft 38, the steering wheels will be correspondingly shifted. The driving axles 13 have each secured thereto a brake drum 46 having associated therewith a brake 47 operated by a rod 48. Each rod 48 has its forward end disposed beneath the annular support and provided with a ratchet rack 49. These ratchet racks are disposed at opposite sides of the annular support and at corresponding points upon a diameter of the support. The upper braces 35 provide bearings 50 for an idler shaft 51, which extends longitudinally of the frame and is provided at its center with a gear 52 meshing with the gear 28 of the drive shaft. At points equally spaced from the gear 52, this shaft has further secured thereto a pair of gears 53, the purpose of which will presently appear.

The numeral 54 generally designates a body frame having at its center a ring structure 55 to seat upon the annular support 34. The annular support 34 is preferably provided with rollers 56 with which the ring directly engages and the connection between the support and ring at 57 prevents vertical displacement of the body structure. The ends of the body frame 54 are preferably arcuately curved and are each provided with a groove 58 to receive a tongue 59 carried by the chassis frame 10. This body frame mounts the engine 60 and its controls, carries a fuel storage tank 61 and provides seats 62 for the occupants. The body 63 superimposed upon this frame designated in dotted lines preferably has its ends constructed to merge with dummy body sections 64 carried by the chassis frame.

The drive shaft 65 of the engine has splined upon its inner end a gear 66 and adjacent the engine a bevel gear 67. These gears are connected for simultaneous movement in opposite directions by a lever 68 adjacent the driver's seat. The gear 66 when at the inner limit of its movement is positioned for engagement with one of the gears 53 of the shaft 51 to transmit drive from the engine to the shaft 51 and thus to the drive shaft 27. The gear 67 when at the inner limit of its movement is engaged with a gear 69 formed upon the outer rim of the annular support 34 and provides a connection whereby the energy of the engine may be employed to rotate the body frame 54 and its associated mechanism upon the chassis frame 10.

A brake lever mounting is provided including a pivoted arm 70 having means associated therewith whereby it may be held in raised and lowered positions. Pivoted upon this arm is a brake lever 71 having at its lower end a ratchet block 72 which, when the arm 70 is in lowered position, engages one or the other of the rack blocks 49. When the arm 70 is in raised position, the block 72 clears the rack block 49, so that rotation of the body and its frame upon the chassis is not interfered with. Upon the dash board 73 of the body, a bracket extends rearwardly and upwardly, as indicated at 74. This bracket has pivotally mounted thereon to swing in a vertical plane about the pivot 85, a shaft section 75, the lower end of which has a rearwardly and downwardly projecting fork 76. Rotatable upon this shaft section are a steering wheel 77 and a gear 78 which is secured to the steering wheel. The deck 79 of the body affords a bearing 80 for a vertically extending shaft 81 having at its upper end a gear 82 meshing with the gear 78 and at its lower end a squared portion 83 adapted to enter the socket 39 of a short shaft 38 with which it is aligned. This shaft has intermediate its ends a groove 84 receiving the fork. When the steering wheel 77 and the shaft upon which it is mounted are swung forwardly about the pivot 85, the fork 76 will elevate the shaft 81 to withdraw its squared lower end 83 from the socket 39 and to a point where the shaft will not in any way interfere with rotation of the body and its frame upon the chassis frame.

Assuming that it is desired to reverse the body on the frame, the operations are as follows: The brake mounting is shifted to disengage the ratchet blocks 49 and 72 from one another. The steering wheel is then thrown upwardly and forwardly elevating the shaft 81 at which time the body is ready for turning. It is pointed out that the shaft 81 in addition to acting as a steering transmission shaft acts as a latch, effectually preventing any tendency to relative rotation of the frames 10 and 54.

With the above operations completed, the lever 68 is shifted to engage the gear 67 with the gear 69 of the annular support 34 and the engine thrown in gear. The engine power is thus employed to rotate the body. When the body arrives at the proper point, the shaft 81 may be lowered, latching the body and reconnecting the steering mechanism and arm 70 may be lowered to reconnect the brake mechanism. It will be obvious that if desired, other latching means may be provided to assist in securing the body and chassis against relative movement.

Since the construction hereinbefore set forth is capable of a certain range of change and modification without materially departing from the spirit of the invention, I do not limit myself to such specific structure except as hereinafter claimed.

I claim:

1. In a self-propelled vehicle, a chassis including a frame and supporting steering wheels therefor, connections between all of the wheels for simultaneously shifting the same, a body frame rotatably mounted upon the chassis frame, rotatable operating members for the connections between the wheels supported from the chassis at points diametrically opposed as regards the axis of rotation of the body frame and steering mechanism carried by the body frame including a vertically shiftable shaft, means for rotating said shaft, means for vertically shifting the shaft and means at the lower end of the shaft for operatively engaging a rotating operating member with which it is aligned.

2. In a self-propelled vehicle, a chassis including a frame and supporting-steering wheels therefor, connections between all of the wheels for simultaneously shifting the same, a body frame rotatably mounted upon the chassis frame, operating members for said connections and rotatably mounted on the chassis frame at points diametrically opposed as regards the axis of rotation of the body frame, an oscillatable shaft carried by the body frame, a steering wheel rotatably supported by the shaft, a gear rotated by the steering wheel, a second shaft carried by the body frame and adapted to aline with one or the other of the operating members, a gear carried by said second shaft and meshing with said first gear, means supporting said second shaft on the body frame for rotation and for endwise movement toward and away from the rotating member with which it is alined, means embodying elements carried by the rotating members and second shaft and adapted when the shaft is moved endwise in one direction to establish an operative connection between said shaft and the operating member with which it is alined and adapted when said second shaft is moved endwise in the opposite direction to release it from engagement with such member, and means carried by said first shaft and engaging said second shaft to permit said second shaft to be moved by said first shaft into and out of operative engagement with respect to the operating member with which it is alined.

3. In a self-propelled vehicle, a chassis including a frame and supporting-steering wheels therefor, connections between all of the wheels for simultaneously shifting the same, a body frame rotatably mounted upon the chassis frame, operating members for said connections and rotatably jointed on the chassis frame at points diametrically opposed as regards the axis of rotation of the body frame, an oscillatable shaft carried by the body frame, a steering wheel rotatably supported by the shaft, a gear rotated by the steering wheel, a second shaft carried by the body frame and adapted to aline with one or the other of the operating members, a gear carried by said second shaft and meshing with said first gear, means supporting said second shaft on the body frame for rotation and for endwise movement toward and away from the rotating member with which it is alined, means embodying elements carried by the rotating members and second shaft and adapted when the shaft is moved endwise in one direction to establish an operative connection between said shaft and the operating member with which it is alined and adapted when said second shaft is moved endwise in the opposite direction to release it from engagement with such member, said second shaft being provided with a groove, and a fork carried by said first shaft and engaging in said groove to permit said second shaft to be moved by said first shaft into and out of operative relation to the rotating member with which it is alined.

4. In a self-propelled vehicle, a chassis including a frame and supporting-steering wheels therefor, connections between all the wheels for simultaneously actuating the same, a body frame rotatably mounted upon the chassis frame, operating members rotatably mounted on the chassis frame and having driving connection with said connections, a vertical shaft carried by the body frame in position to be alined with one or the other of the operating members by rotation of the body frame, means for supporting the shaft on the body frame for rotation and for vertical adjustment, cooperating elements carried by the rotating members and the lower end of the shaft and adapted when the shaft is moved downwardly to establish an operative connection between said shaft and the operating member with which it is alined and adapted when the shaft is moved upwardly to release it from engagement with such member, a gear fixed to the shaft, a steering wheel, a gear fixed to the steering wheel and meshing with said first gear, means rockably and rotatably supporting the steering wheel from the body frame, and means connected to said steering wheel supporting means and to the shaft to permit the steering wheel to be used for the purpose of raising and lowering the shaft.

5. In a self propelled vehicle, a chassis frame having supporting steering wheels and drive mechanism connected therewith, a body frame rotatable upon the chassis frame, a power plant carried by the body frame, means for selectively establishing a driving connection between the engine and the body frame for turning the body frame upon the chassis frame and between the engine and said drive mechanism to propel the chassis frame, a steering mechanism carried by the body frame, means for connecting the steering mechanism with the steering wheels when either end of the body frame is in alinement with a given end of the chassis frame, and means forming a part of said steering mechanism connecting means for locking the body frame against rotation with relation to the chassis frame.

6. In a self propelled vehicle, a chassis including a frame and supporting steering wheels therefor, steering connections between all of the wheels for simultaneously actuating the same, a body frame rotatably mounted upon the chassis frame, and steering mechanism including a separable part operatively coupled with said connections when the body frame has either end thereof disposed in alinement with a given end of the chassis frame, said part having one portion permanently and rigidly carried on the body frame and another portion permanently and rigidly carried on the chassis frame, which portions when joined function to lock the body frame against rotation upon the chassis frame.

WILLIE REED.